United States Patent [19]

Kraus

[11] Patent Number: 4,730,504

[45] Date of Patent: Mar. 15, 1988

[54] AXIAL CAM STRUCTURE

[75] Inventor: Charles E. Kraus, Austin, Tex.

[73] Assignee: Excelermatic Inc., Austin, Tex.

[21] Appl. No.: 946,895

[22] Filed: Dec. 29, 1986

[51] Int. Cl.$^4$ .......................... F16H 15/38; F16D 3/06
[52] U.S. Cl. ....................................... 74/200; 464/167
[58] Field of Search ................. 74/198, 199, 200, 208, 74/201, 99 A; 464/139, 167; 474/19

[56] References Cited

U.S. PATENT DOCUMENTS

| 2,097,631 | 11/1937 | Madle | 74/200 |
|---|---|---|---|
| 2,201,176 | 5/1940 | Hayes | 74/200 |
| 2,951,388 | 9/1960 | Tacquet | 474/19 |
| 3,087,348 | 4/1963 | Kraus | 74/200 |
| 3,530,732 | 9/1970 | Kashihara | 74/199 |
| 3,653,272 | 4/1972 | Scheiter | 74/200 |
| 3,765,257 | 10/1973 | Ogino | 74/199 |
| 3,810,398 | 5/1974 | Kraus | 74/200 |
| 4,052,915 | 11/1977 | Kraus | 74/798 |
| 4,454,788 | 6/1984 | Kraus | 74/798 |

FOREIGN PATENT DOCUMENTS

| 506663 | 11/1951 | Belgium | 74/199 |
|---|---|---|---|
| 869938 | 2/1942 | France | 74/200 |

Primary Examiner—Lawrence Staab

[57] ABSTRACT

An axial cam structure is formed with outer and inner concentric shaft portions which are rotationally and axially movable relative to one another and which have formed at their interface sets of radially adjacent V-shaped camming cavities pointed in opposite axial directions with a camming ball disposed in each of the sets of cavities. The camming ball bears on the side walls of the cavity in the outer and, at its opposite side, the side walls of the respective cavity of the inner shaft portion so that any torque transmitted between the inner and outer shaft portions through the camming ball provides for corresponding oppositely directed axial forces on the inner and outer shaft portions.

4 Claims, 7 Drawing Figures

AXIAL CAM STRUCTURE

BACKGROUND OF THE INVENTION

Axial cam structures are utilized for example in traction roller transmissions in which the traction surfaces are forced into firm engagement with one another with a force which depends on the torque transmitted through the transmission. A planetary type traction roller transmission utilizing axial cam structures is shown for example in applicant's U.S. Pat. No. 4,052,915. An infinitely variable traction roller transmission also utilizing an axial cam structure for forcing the toric discs into engagement with the motion transmitting traction rollers therebetween is disclosed in applicant's U.S. Pat. No. 3,810,398. It is noted that these transmissions should be capable of transmitting torque in either direction. The axial cam structures therefore must be relatively low. In any case, with ball or roller cams axial movement of the two elements provided with the opposite cam surfaces cannot be greater than the ball or roller diameter. A cam structure of the type which is capable of transmitting torque forces in both directions of transmission operation and which includes rollers is shown in detail in applicant's U.S. Pat. No. 4,454,788 where the rollers 22 are disposed between the cam surfaces 20 and 21 of the opposite cam members 17 and 15. While such an arrangement provides for large axial forces it does not provide for large axial travel of the two members separated by the cam structure.

However, for some applications it is important to provide for relatively large axial torque-dependent relative movement and also to provide for such axial movement in a relatively small space.

It is the object of the present invention to provide a cam structure which fulfills the above requirements and which furthermore is inexpensive and easy to manufacture.

SUMMARY OF THE INVENTION

An axial cam structure is formed with outer and inner concentric shaft portions or a sleeve disposed on a shaft, which are rotationally and axially movable relative to one another and which have formed at their interface sets of radially adjacent V-shaped camming cavities pointed in opposite axial directions with a camming ball disposed in each of the sets of cavities. The camming ball, which has a diameter of about the combined depths of the set of cavities, bears on a side wall of the cavity in the outer and, at its opposite side, a side wall of the respective cavity of the inner shaft portion so that any torque transmitted between the inner and outer shaft portions through the camming ball provides for correspondingly oppositely directed axial forces on the inner and outer shaft portions.

The camming cavities may be formed adjacent the ends of the shaft portions and may be axially open. However, they may also be formed remote from the ends of the shaft portions wherein ball installation bores are then provided for example in the outer shaft portions which bores, after insertion of the balls, would then be plugged.

With the arrangement according to the invention, a cam arrangement with large axial separation capabilities far beyond the cam ball diameter is achieved, which requires little space so that it could even fit into the sun roller of a planetary type traction roller transmission and which is relatively inexpensive to manufacture and, like ball bearings, reliable in operation.

SHORT DESCRIPTION OF THE DRAWINGS

DESCRIPTION OF A PREFERRED EMBODIMENT

Figure 5:
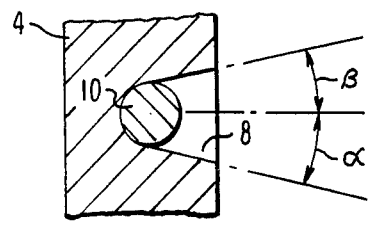
FIG. 5 is a view along line V—V of FIG. 1.
Figure 1:
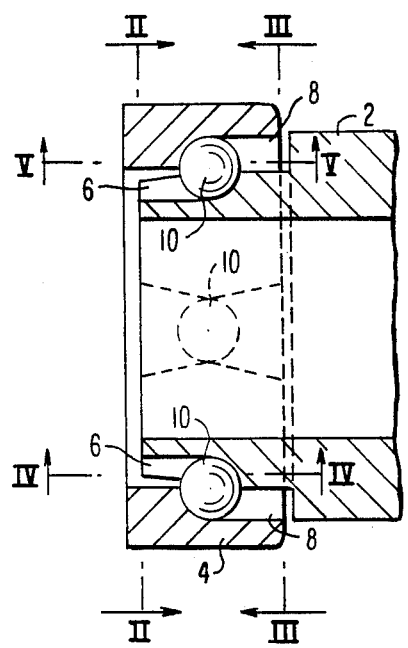
FIG. 1 is an axial cross-sectional view of the axial cam structure.
Figure 4:
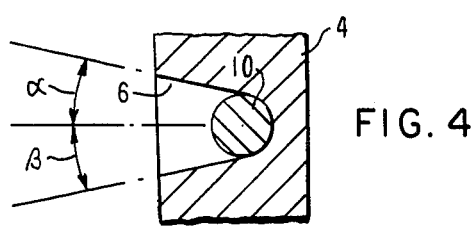
FIG. 4 is a view along line IV—IV of FIG. 1.
Figure 2:
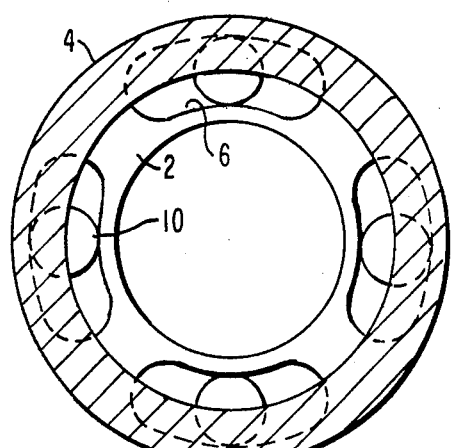
FIG. 2 is a view along line II—II of FIG. 1.
Figure 3:
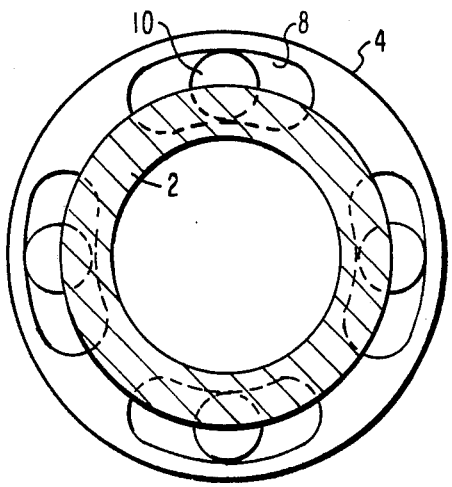
FIG. 3 is a view along line III—III of FIG. 1.

As shown in FIG. 1, the axial cam structure is formed by two concentric shaft portions 2 and 4 an inner shaft portion 2 and an outer shaft portion 4 which telescopingly receives the inner shaft section 2. Both shaft portions have axial camming cavities 6 and 8 formed therein as more clearly shown in FIGS. 2, 3, 4 and 5. The camming cavity 6 in the inner shaft portion as shown in FIG. 4 extends, and is open, in one axial direction whereas the camming cavity 8 as shown in FIG. 5 extends and is open toward the opposite axial direction and a camming ball 10 is received in the space formed by the camming cavities of the inner and the outer shaft portions 2 and 4. The camming cavities are essentially V-shaped, the angles $\alpha$ and $\beta$ of the V being selected so as to provide the desired relative axial force when a torque is transmitted from one of the shaft portions to the other in either direction of torque transmission. If the desired relative axial force is to be the same independently of the direction of torque transmission, the angles $\alpha$ and $\beta$ are the same. If a small axial force is desired, the angles $\alpha$ and $\beta$ are relatively small; if a larger axial force is desired, the angles $\alpha$ and $\beta$ are made to be larger.

In any case the axial depth of the cavities 6 and 8 may be made of substantial axial length so that substantial axial relative movement between the inner and outer shaft portions can be achieved since the ball is in engagement at the inside only with the inner shaft section and at the outside with the outer shaft portion and the inner and outer shaft portions are telescopically movable relative to one another.

Manufacture of the cam area is quite simple. A ball end mill having a spherical end cutter of a diameter of the ball is utilized to cut the V-shaped cavities for each the inner and outer shaft sections. The inner and outer shaft portions are then telescoped into one another with the camming cavities in axial alignment and a ball inserted.

Figure 6:
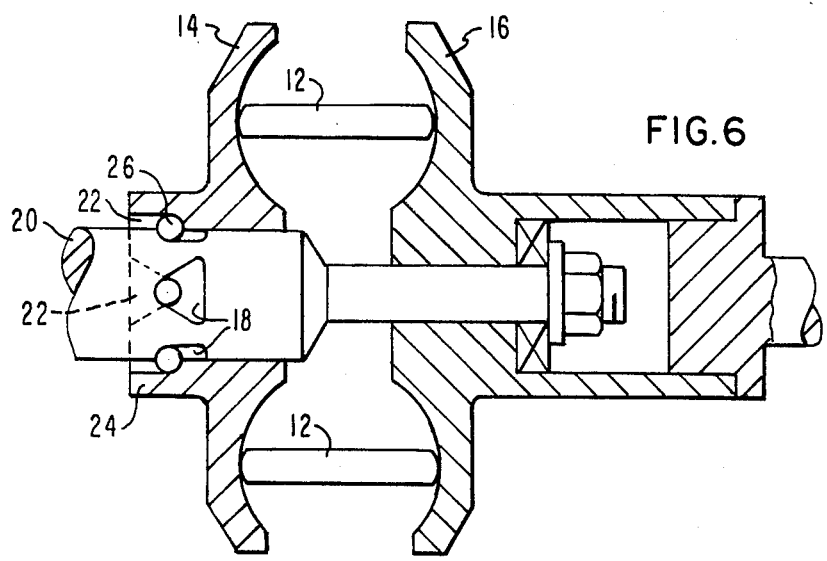
FIG. 6 is a view of a transmission including the axial cam structure according to the invention.

It is noted that it is not necessary that both camming cavities are axially open. As shown in FIG. 6, where the axial cam structure according to the invention is shown in connection with a traction roller transmission in which the motion transmitting rollers 12 are engaged between two oppositely arranged toric discs 14 and 16, the camming cavities 18 in the shaft 20 are not axially open. However the corresponding cavities 22 in the hub 24 of the toric disc 14 are. Nevertheless assembly is quite easy by placing the balls 26 into the cavities 18 in the shaft 20 and sliding the hub 24 over the shaft 20 so that the projecting halves of the balls 26 are received in the cavities 22 of the hub 24.

Figure 7:
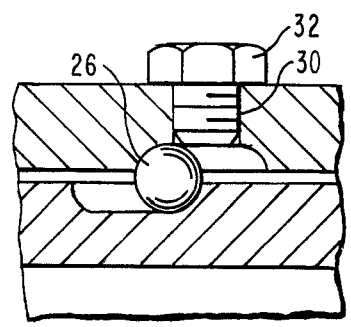
FIG. 7 shows in cross-section a cam structure with a ball insertion bore.

It is also possible to arrange the camming cavities remote from the ends of both shaft portions and provide preferably in the outer shaft portion which is generally more easily accessible, a ball insertion hole 30 which, after insertion of the ball, is plugged by a screw plug 32 for example as shown in FIG. 7.

What is claimed is:

1. An axial cam structure comprising outer and inner concentric shaft portions adapted to be rotationally and axially movable relative to one another and having radially adjacent inner and outer cylindrical surfaces, the outer of said concentric shaft portions having a camming cavity formed in said inner cylindrical surface thereof and the inner of said concentric shaft portions having a camming cavity formed in said outer cylindrical surface thereof, said camming cavities being arranged so as to be essentially radially adjacent one another, each being essentially V-shaped with the V-shape of the cavities being pointed in opposite axial directions and having radially overlapping areas of predetermined radial depth and a camming ball of a diameter corresponding to the combined radial depth of said cavities disposed in the space formed by the overlapping cavity areas so that any torque transmitted between said inner and outer shaft portions through said camming balls results in corresponding oppositely directed axial forces on said inner and outer shaft portions.

2. An axial cam structure according to claim 1, wherein said V-shaped camming cavities are formed adjacent the axial ends of said concentric shaft portions and are axially open in opposite axial directions.

3. An axial cam structure according to claim 1, wherein the side walls of said camming cavities are curved correspondingly to the curvature of the camming ball therein.

4. A traction roller transmission including traction surfaces adapted to be forced into engagement with one another with a force depending on the torque transmitted through the transmission, said transmission including an axial cam structure comprising outer and inner concentric shaft portions adapted to be rotationally and axially movable relative to one another and having radially adjacent inner and outer cylindrical surfaces, the outer of said concentric shaft portions having a camming cavity formed in said inner cylindrical surface thereof and the inner of said concentric shaft portions having a camming cavity formed in said outer cylindrical surface thereof, said camming cavities being arranged so as to be essentially radially adjacent one another, each being essentially V-shaped with the V-shape of the cavities being pointed in opposite axial directions and having radially overlapping areas of predetermined radial depth and a camming ball of a diameter corresponding to the combined radial depth of said cavities disposed in the space formed by the overlapping cavity areas so that any torque transmitted between said inner and outer shaft portions through said camming balls results in corresponding oppositely directed axial forces on said inner and outer shaft portions utilized to force the traction surfaces into engagement with one another with a force corresponding to the torque transmitted.

* * * * *